US012688018B2

(12) United States Patent
 Hicks

(10) Patent No.: US 12,688,018 B2
(45) Date of Patent: Jul. 21, 2026

(54) MULTIPATHING FOR SOURCE CODE EXECUTION

(71) Applicant: International Business Machines Corporation, Armonk, NY (US)

(72) Inventor: Andrew C. M. Hicks, Highland, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 317 days.

(21) Appl. No.: 18/499,524

(22) Filed: Nov. 1, 2023

(65) Prior Publication Data

US 2025/0138793 A1 May 1, 2025

(51) Int. Cl.
 G06F 8/41 (2018.01)

(52) U.S. Cl.
 CPC ..................................... G06F 8/43 (2013.01)

(58) Field of Classification Search
 CPC ....................................................... G06F 8/43
 See application file for complete search history.

(56) References Cited

U.S. PATENT DOCUMENTS 9,122,488 B2 * 9/2015 Martin .................... G06F 8/456
2006/0075306 A1 * 4/2006 Chandrasekaran ..........................
 G06F 11/3688
 714/47.2

2007/0288734 A1 * 12/2007 Luick .................... G06F 9/3836
 712/237
2008/0307266 A1 * 12/2008 Chandrasekaran ..........................
 G06F 11/3688
 714/48
2009/0037885 A1 * 2/2009 Edwards ............. G06F 11/3688
 717/128
2020/0125732 A1 * 4/2020 Iyer ..................... G06F 11/3612
2020/0394129 A1 * 12/2020 Hicks .................. G06F 11/3688

OTHER PUBLICATIONS

Chen, Zhangyu et al., "Efficiently Detecting Concurrency Bugs in Persistent Memory Programs," Proceedings of the 27th ACM International Conference on Architectural Support for Programming Languages and Operating Systems, pp. 873-887, 2022.
Jeong, Dae R. et al., "SEGFUZZ: Segmentizing Thread Interleaving to Discover Kernel Concurrency Bugs through Fuzzing," 2023 IEEE Symposium on Security and Privacy (SP), pp. 2104-2121, IEEE Computer Society, 2023.

(Continued)

*Primary Examiner* — Phillip H Nguyen
(74) *Attorney, Agent, or Firm* — Teddi Maranzano, Esq.; Heslin Rothenberg Farley & Mesiti P.C.; George S. Blasiak, Esq.

(57) ABSTRACT

Techniques and methods for generating multiple paths of execution during the compilation process are provided. One or more portions of a software-based task to be executed are identified. A plurality of segments of compiled code for executing the identified one or more portions of the software-based task are generated. Errors during execution of a first segment of compiled code from the plurality of segments of compiled code are monitored. Upon detecting an error in the first segment of compiled code, a second segment of compiled code from the plurality of segments of compiled code is executed.

20 Claims, 7 Drawing Sheets

(56)  References Cited

OTHER PUBLICATIONS

Chatterjee, Krishnendu et al., "Analyzing the Impact of Change in Multi-threaded Programs," Fundamental Approaches to Software Engineering: 13th International Conference, FASE 2010, Held as Part of the Joint European Conferences on Theory and Practice of Software, ETAPS 2010, Paphos, Cyprus, Mar. 20-28, 2010. Proceedings 13, pp. 293-307, Springer Berlin Heidelberg, 2010.

* cited by examiner

100

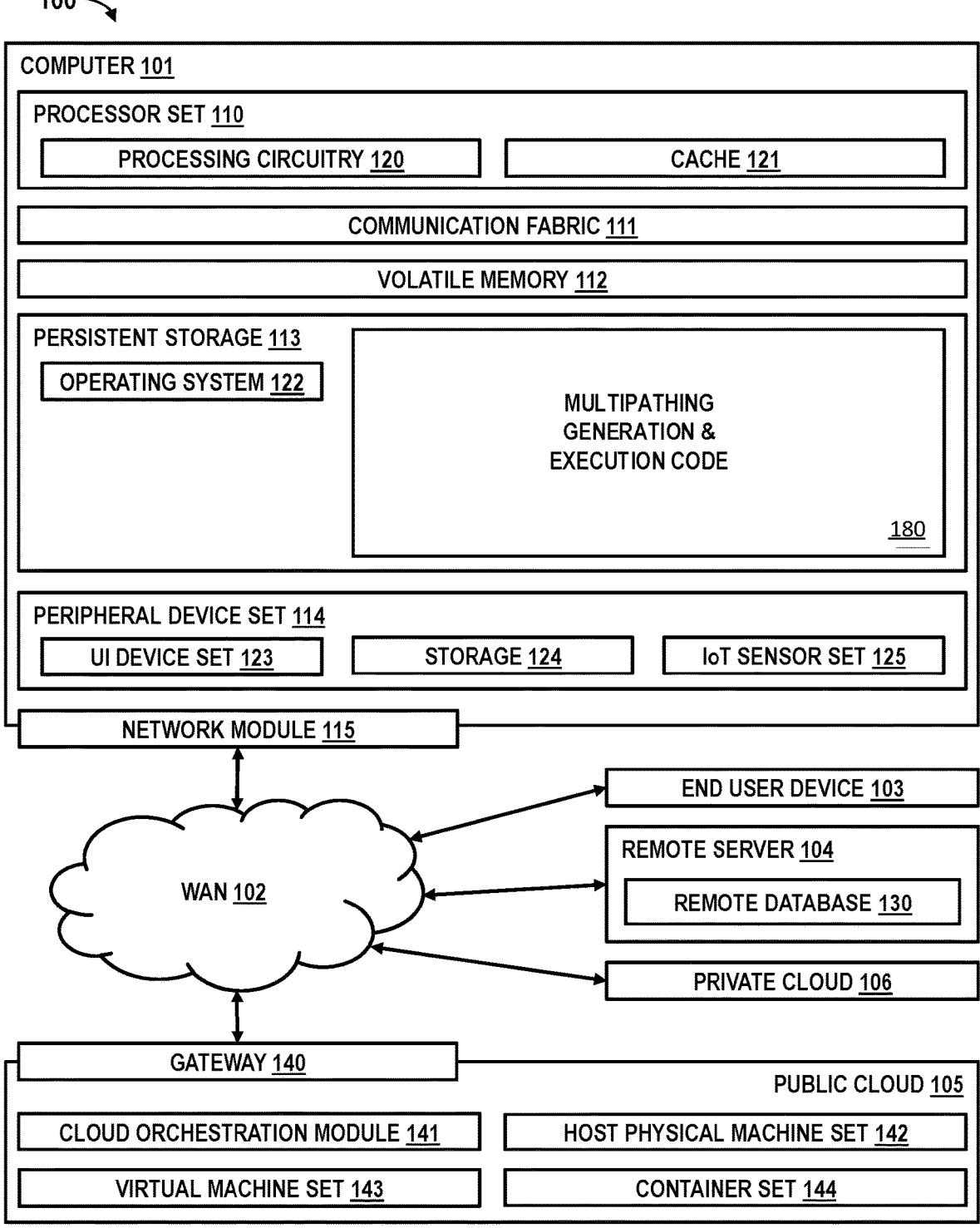

COMPUTER 101

PROCESSOR SET 110

PROCESSING CIRCUITRY 120

CACHE 121

COMMUNICATION FABRIC 111

VOLATILE MEMORY 112

PERSISTENT STORAGE 113

OPERATING SYSTEM 122

MULTIPATHING GENERATION & EXECUTION CODE

180

PERIPHERAL DEVICE SET 114

UI DEVICE SET 123

STORAGE 124

IoT SENSOR SET 125

NETWORK MODULE 115

WAN 102

END USER DEVICE 103

REMOTE SERVER 104

REMOTE DATABASE 130

PRIVATE CLOUD 106

GATEWAY 140

PUBLIC CLOUD 105

CLOUD ORCHESTRATION MODULE 141

HOST PHYSICAL MACHINE SET 142

VIRTUAL MACHINE SET 143

CONTAINER SET 144

FIG. 1

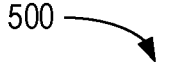
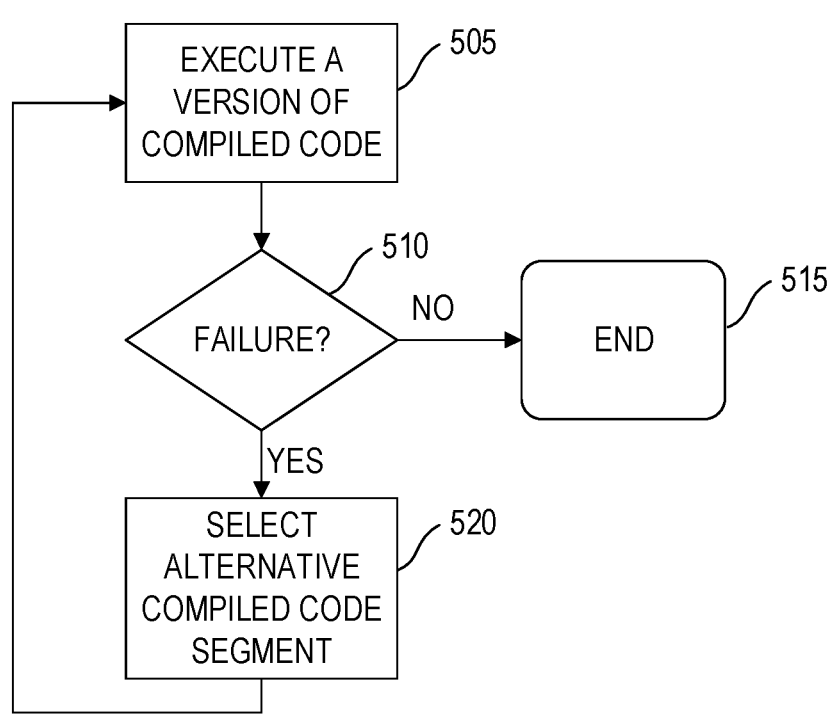
FIG. 5

600

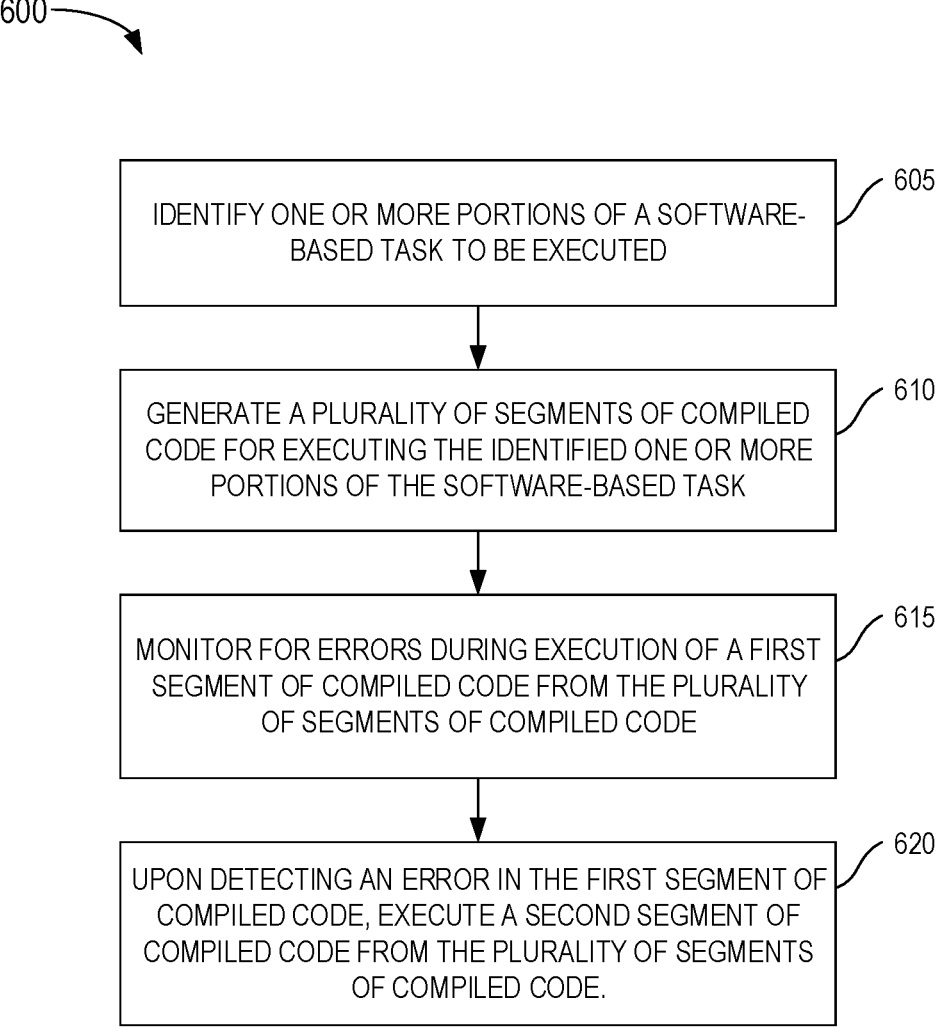

605
IDENTIFY ONE OR MORE PORTIONS OF A SOFTWARE-BASED TASK TO BE EXECUTED

610
GENERATE A PLURALITY OF SEGMENTS OF COMPILED CODE FOR EXECUTING THE IDENTIFIED ONE OR MORE PORTIONS OF THE SOFTWARE-BASED TASK

615
MONITOR FOR ERRORS DURING EXECUTION OF A FIRST SEGMENT OF COMPILED CODE FROM THE PLURALITY OF SEGMENTS OF COMPILED CODE

620
UPON DETECTING AN ERROR IN THE FIRST SEGMENT OF COMPILED CODE, EXECUTE A SECOND SEGMENT OF COMPILED CODE FROM THE PLURALITY OF SEGMENTS OF COMPILED CODE.

*FIG. 6*

MULTIPATHING FOR SOURCE CODE EXECUTION

BACKGROUND

The present invention relates to program code execution, and more specifically, to enhancing system resiliency by generating multiple paths of execution during the compilation process.

Computer systems and applications can be highly complex. With increased complexity, the likelihood of errors during execution also rises. Such errors may compromise the entire system, potentially making it unstable, which is especially problematic for core systems that demand high resiliency. A single error in these core systems may not only disrupt their primary operations, but also have cascading effects that cause these linked or connected systems or operations to fail.

The most common method for identifying and addressing these errors is the use of an exception detection system that identifies errors and implements recovery or retry logic. Exception detection mechanisms are designed primarily to handle expected and anticipated error types. For example, a developer may anticipate situations like network timeouts or database disconnections, and write an exception handler to deal with these anticipated exceptions.

However, while they prove effective for such anticipated issues, the exception detection mechanisms become less reliable when repeatedly encountering the same errors along the same execution path. Additionally, the performance of the mechanisms can be further reduced when dealing with unanticipated or unknown errors—those not foreseen by the developer—as those might not have specific exception handlers or the necessary recovery protocols. Therefore, when dealing with core systems where high resilience and reliability are required, merely relying on traditional exception handling mechanisms is not sufficient. For such systems, a more reliable and adaptive approach is needed to ensure uninterrupted functioning and prevent catastrophic failure.

SUMMARY

One embodiment presented in this disclosure provides a method, including identifying one or more portions of a software-based task to be executed, generating a plurality of segments of compiled code for executing the identified one or more portions of the software-based task, monitoring for errors during execution of a first segment of compiled code from the plurality of segments of compiled code, and upon detecting an error in the first segment of compiled code, executing a second segment of compiled code from the plurality of segments of compiled code.

Other embodiments in this disclosure provide non-transitory computer-readable mediums containing computer program code that, when executed by operation of one or more computer processors, performs operations in accordance with one or more of the above methods, as well as systems comprising one or more computer processors and one or more memories containing one or more programs that, when executed by the one or more computer processors, perform an operation in accordance with one or more of the above methods.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

FIG. 1 depicts an example computing environment for the execution of at least some of the computer code involved in performing the inventive methods.

FIG. 5 depicts an example method for implementing different execution paths, according to some embodiments of the present disclosure.

FIG. 6 depicts a flow diagram of an example method for multipathing generation and execution, according to some embodiments of the present disclosure.

To facilitate understanding, identical reference numerals have been used, where possible, to designate identical elements that are common to the figures. It is contemplated that elements disclosed in one embodiment may be beneficially used in other embodiments without specific recitation.

DETAILED DESCRIPTION

Figure 2:
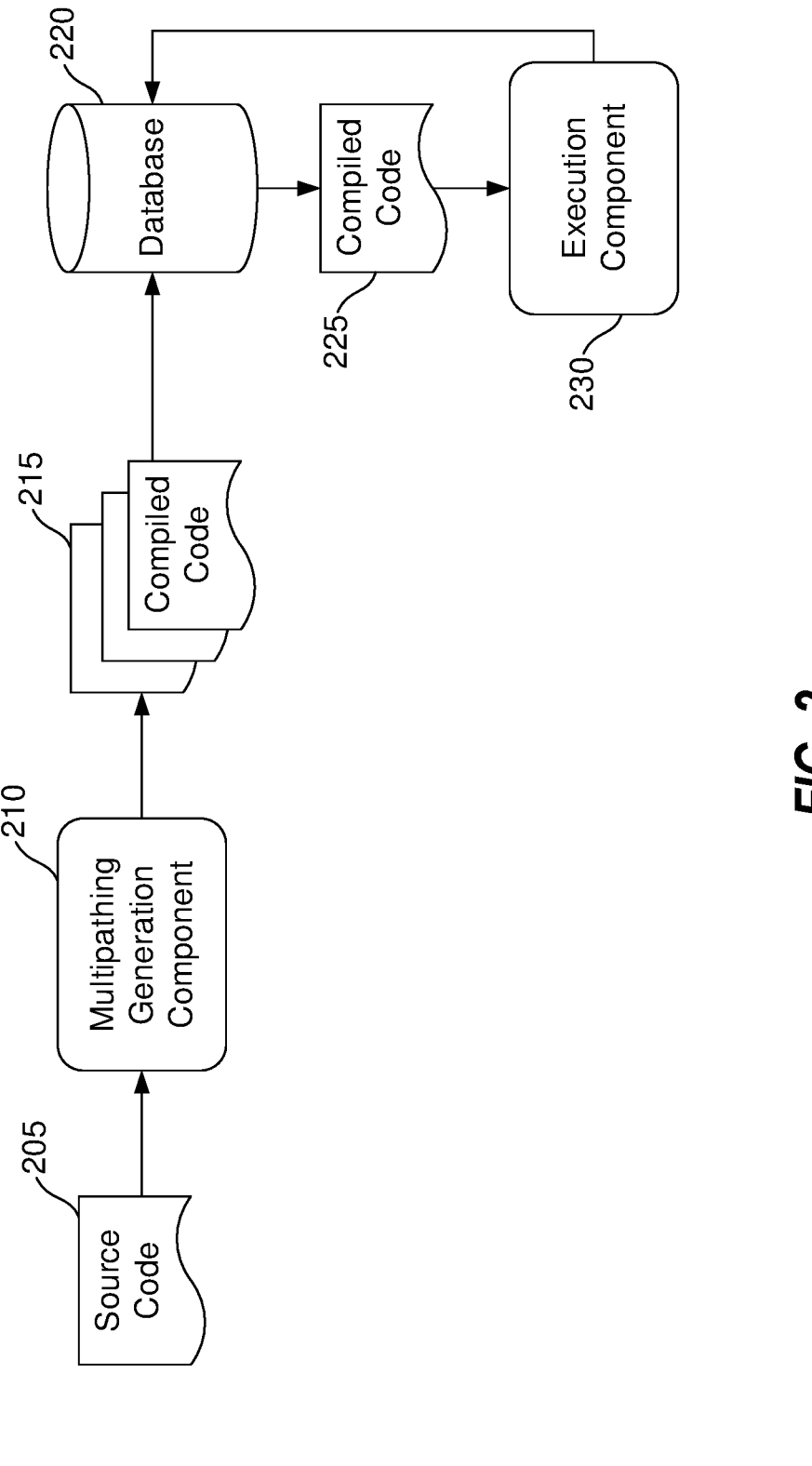
FIG. 2 depicts an example of a workflow for multipathing generation and execution, according to some embodiments of the present disclosure.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Embodiments of the present disclosure provide techniques and methods to generate multiple program execution paths during the compilation process. Many components of a computer system or software application, such as specific segments of source code, rely on successful implementation and consistent availability. To ensure the system's consistency and reliability, the present disclosure provide techniques and methods that enable generation of multiple execution paths for a designated task (or a segment of source code). Among the multiple paths of execution, each path implements the same task (or the same segment of source code) in a slightly different way. If a failure occurs during one of these paths, the system may rewind to the beginning and execute the task (or the segment of software code) again using an alternative path where the error may not reoccur. To generate these different paths of execution, various code generation mechanisms may be used to introduce differences in timing, sequencing, and/or other variations in execution. For example, in one embodiment, the multiple paths of execution (also referred to as segments or sequences of compiled code and/or machine code) may be generated by different compilers (or different compiler versions). Each compiler produces slightly different assembly or machine code, resulting in variations in timing or sequencing during execution. The variations in the resultant code, despite stemming from the same high-level source code, can lead to distinct execution paths, each potentially resilient to different types of errors or interruptions. In some embodiments, instead of or in addition to using multiple compilers, a single compiler with various optimization settings may be applied to generate different machine code having different execution paths. The varying optimization settings may introduce minor differences in how the software code is implemented during compilation. In some embodiments, logically independent code may be identified. These logically independent code may refer to segments or blocks of code that do not depend on each other in terms of their execution order. By rearranging these logically independent code segments, multiple unique execution paths may be produced.

FIG. 1 depicts an example computing environment for the execution of at least some of the computer code involved in performing the inventive methods.

Computing environment 100 contains an example of an environment for the execution of at least some of the computer code involved in performing the inventive methods, such as Multipathing Generation and Execution Code 180. In addition to Multipathing Generation and Execution Code 180, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and Multipathing Generation and Execution Code 180, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in Multipathing Generation and Execution Code 180 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in Multipathing Generation and Execution Code 180 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 7:
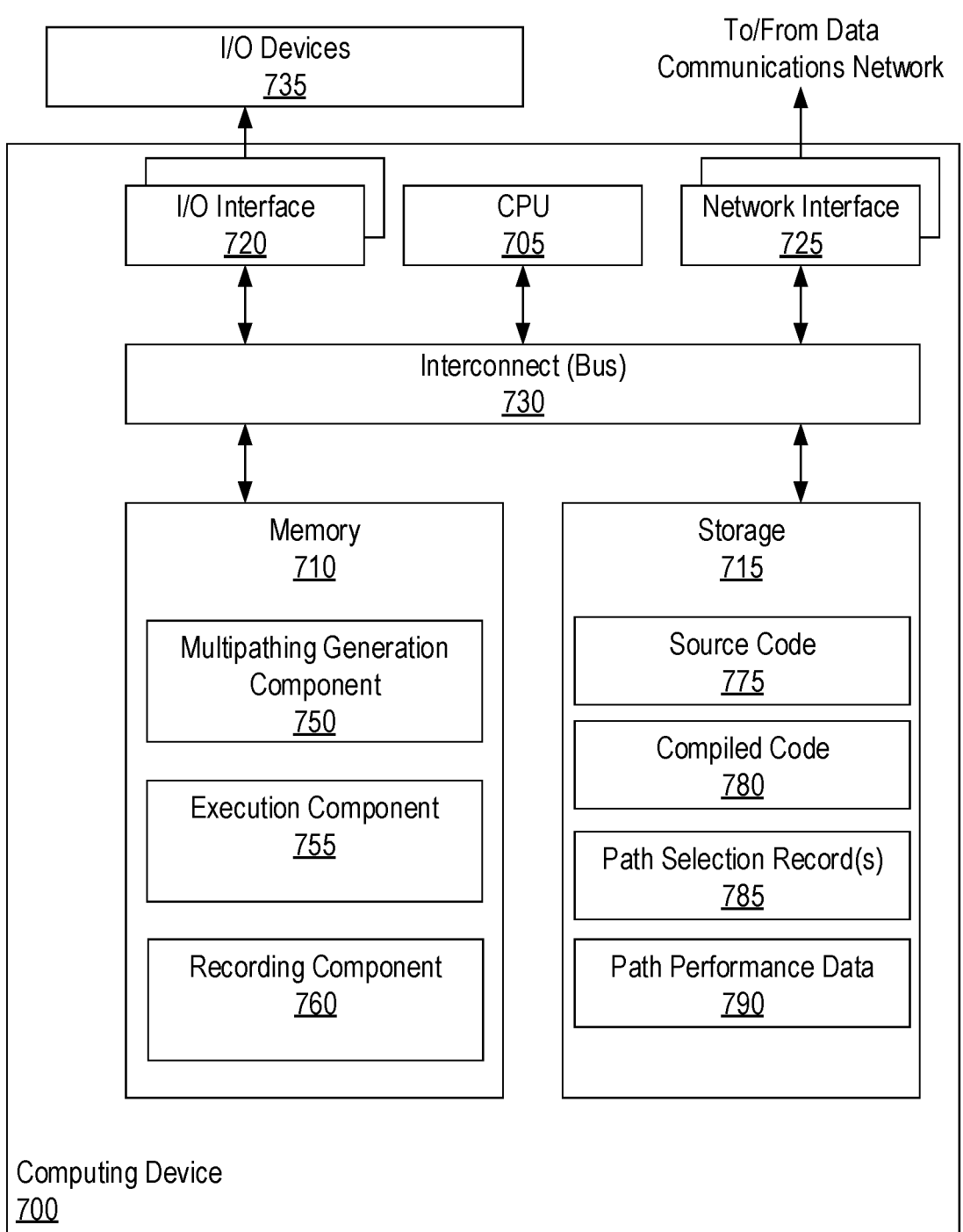
FIG. 7 depicts an example computing device for multipathing generation and execution, according to some embodiments of the present disclosure.

FIG. 2 depicts an example of a workflow 200 for multipathing generation and execution, according to some embodiments of the present disclosure. In some embodiments, the workflow 200 may be performed by one or more computing systems, such as the computer 101 as illustrated in FIG. 1, and/or the computing device 700 as illustrated in FIG. 7.

In the illustrated example, source code 205 is provided to a multipathing generation component 210. In one embodiment, the source code 205 may refer to a set of instructions or software code developed for specific tasks, operations, and/or functions within a target system (e.g., a computer system, or a software application). In some embodiments, the source code 205 may be written in a high-level or human-readable programming language, such as Java, Python, C++, or others, depending on the requirements of the target system and its development environment.

In the illustrated example, upon receiving the source code 205, the multipathing generation component 210 applies various compilation mechanisms to the source code 205, and generates multiple versions of compiled code 215. In one embodiment, each version of compiled code 215 may represent and/or implement a distinct execution path. These paths may vary from one another in aspects like timing and/or sequencing of executing certain functions. For example, by adjusting the timing during compilation (e.g., by introducing random delays), sections of code intended for concurrent operation (or that may otherwise be executed concurrently) may be executed at different times. Such timing or sequence modifications during the compilation process may produce different versions of compiled code 215. When these versions of compiled code are executed, they may help to avoid certain failures or defects caused by improper or missing serialization. In some embodiments, the different versions of compiled code that vary in timing and/or sequencing may be generated by using different versions of compilers (e.g., GCC v10, or GCC v11), each with its own algorithms and strategies for compilation operations such as optimization, register allocation, memory management, instruction scheduling, and the like. In some embodiments, the variations in the compiled code may be achieved by utilizing a single compiler with different optimization settings (e.g., "O0" for no optimization, "O1" for basic optimization, "O2" for full optimization, and "O3" for maximum optimization). In some embodiments, logically independent code segments within the source code may be identified, and variations in the compiled code may be generated by altering the execution order of these independent segments. In some embodiments, the compiled code 215 may be written in a low-level machine-readable language, such as machine code or assembly code.

In the illustrated example, the multiple versions of compiled code 215 are transferred to and stored in a database 220 or other storage or memory repository. In one embodiment, the database 220 serves as a repository that ensures efficient retrieval of specific versions of compiled code when desired.

In the illustrated example, one version of compiled code 225, among the pre-generated versions of compiled code 215, is selected and executed by the execution component 230. In some embodiments, the version of compiled code 225 may be selected based on one or more defined criteria, considering the target system's performance and requirements. For example, the execution component 230 may first select compiled code 225 that is most optimized for the particular hardware of the computing system, only switching to alternative compiled code if the originally selected code fails. If the selected version of compiled code 225 encounters an error or fails to execute properly, the execution component 230 promptly retrieves another one of the pre-generated versions of compiled code 215 from the database 220, and proceeds with its execution. This fallback mechanism ensures that the target system continues its operations with minimal (or at least reduced) disruptions, and thereby improves the system's resilience and adaptability.

In some embodiments, the database 220, the multipathing generation component 210 and the execution component 230 are remote from each other (e.g., operating on distinct computing systems), and communicate with each other via a network. Each of the components may be implemented using discrete hardware systems. The network may include or correspond to a wide area network (WAN), a local area network (LAN), the Internet, an intranet, or any combination of suitable communication mediums that may be available, and may include wired, wireless, or a combination of wired and wireless links. In some embodiments, each of the devices may be local to each other (e.g., within the same local network and/or the same hardware system), and communicate with one another using any appropriate local communication medium, such as a local area network (LAN) (including a wireless local area network (WLAN)), hardwire, wireless link, or intranet, etc.

Though the multipathing generation component 210, the database 220, and the execution component 230 are depicted as discrete components for conceptual clarity, in some embodiments, the operations of the depicted components (and others not depicted) may be combined or distributed across any number and variety of components, and may be implemented using hardware, software, or a combination of hardware and software.

Figure 3:
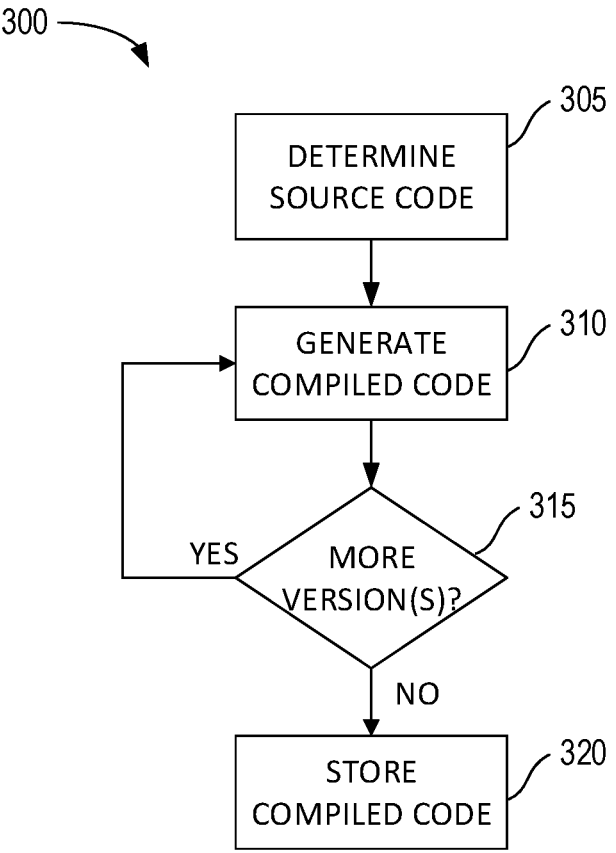
FIG. 3 depicts an example method for generating multiple execution paths for selected source code, according to some embodiments of the present disclosure.

FIG. 3 depicts an example method 300 for generating multiple execution paths for source code, according to some embodiments of the present disclosure. In some embodiments, the method 300 may be performed by one or more computing devices (e.g., a compilation system that compiles source code into compiled or machine-readable code), such as the computer 101 as illustrated in FIG. 1, the multipathing generating component 210 as illustrated in FIG. 2, and/or the computing device 700 as illustrated in FIG. 7.

The method 300 begins at block 305, where a compilation system (e.g., 210 of FIG. 2) identifies source code (e.g., 205 of FIG. 2) to be compiled. In some embodiments, source code may refer to a set of instructions or scripts written in a high-level programming language, such as C++, Java, Python, and the like. The source code may define the desired operations and/or functionalities of a target system. In some embodiments, the target system may be a computer system or a software application that demands high resiliency. The compilation process applies various compilation mechanisms or techniques to the source code, in order to produce multiple execution paths (also referred to in some embodiments as multiple versions of compiled code) (e.g., 215 of FIG. 2). In some embodiments, the source code to be compiled may include the entirety of a program or a subset thereof. In some embodiments, the compilation system may operate on smaller segments of the source code. For example, the developer and/or compilation system may identify or determine specific blocks or segments within the large source code. For each of these identified blocks, the developer and/or compilation system may then generate alternative versions of compiled code. As a result, a sequence or collection of code blocks is identified, with each block having its own set of alternative versions of compiled code.

At block 310, the compilation system generates a version of compiled code from the determined source code. In some embodiments, the generation process may involve translating the source code, written in a high-level programming language, into low-level machine-readable code, such as machine code or assembly code. In some embodiments, the source code may include certain functions (or at least certain sections of code) intended to run concurrently. When translating the source code, factors such as the selected compiler versions, the applied optimization settings, and various compilation strategies may result in producing different versions of compiled code. These versions of compiled code, when executed, may vary in the timing and/or sequencing of executing these functions (or these sections of code) within the source code. For example, by adjusting the timing during compilation (e.g., by introducing random delays), functions that are designed for concurrent execution may be executed or enter their critical sections (e.g., sections of code that access or rely on shared resources or data) at different times. In some embodiments, the variations may lead to distinct runtime behaviors, helping to avoid potential errors or failures caused by improper or missing serialization.

At block 315, the compilation system evaluates whether additional versions of compiled code can or should be generated. The evaluation may be based on a variety of criteria, such as the available resources (e.g., availability of other compiler versions, the availability of other optimization settings, and/or potential rearrangements in the order of logically independent code segments). For example, in one embodiment, suppose that three different compiler versions (e.g., GCC v10, GCC v11, and GCC v12) are available and one compiler (e.g., GCC v10) has already been used to generate one version of compiled code, the compilation system may recognize that two more compile versions (e.g., GCC v11, and GCC v12) are available and can be used to produce additional versions of compiled code. More detail regarding the generation of multiple execution paths is discussed below with reference to FIG. 4.

In some embodiments, at block 315, the compilation system may determine whether a defined or preferred number of alternative segments of compiled code have been generated. For example, a developer or user may specify the number of alternative paths that should be generated, or the compilation system may itself determine the number to generate (e.g., generating more alternative paths for source code where more resiliency is desired).

If the compilation system determines that at least one additional version of compiled code should be generated (e.g., is feasible based on the available resources), the method 300 returns to block 310, where the compilation system generates the next version of compiled code, such as by using a different compiler, by using a different set of optimization settings, by rearranging the order of logically independent code segments, and the like.

If the compilation system determines that no further versions of compiled code should be generated, the method 300 moves to block 320, where the generated versions of compiled code are stored. In some embodiments, the generated versions of compiled code may be saved or stored (e.g., into a database), which provides structured storage and ensures that each version of the compiled code is efficiently managed, retrieved, and executed.

The iterative process ensures that multiple execution paths, represented by different versions of compiled code, are generated based on the same source code. Each execution path is a unique combination influenced by factors such as the selected compiler version, the applied optimization settings, and the ordering of logically independent code segments. In some embodiments, the execution of source code may switch between these varying versions of compiled code to ensure uninterrupted operations. For example, when one version of compiled code fails or encounters errors, it can be switched to another version, thus increasing the likelihood of successful execution. By maintaining multiple execution paths, the operations or functions defined by the source code may be executed more efficiently with minimal (or at least reduced) interruptions, and therefore enhance the target system's resilience and adaptability.

Figure 4:
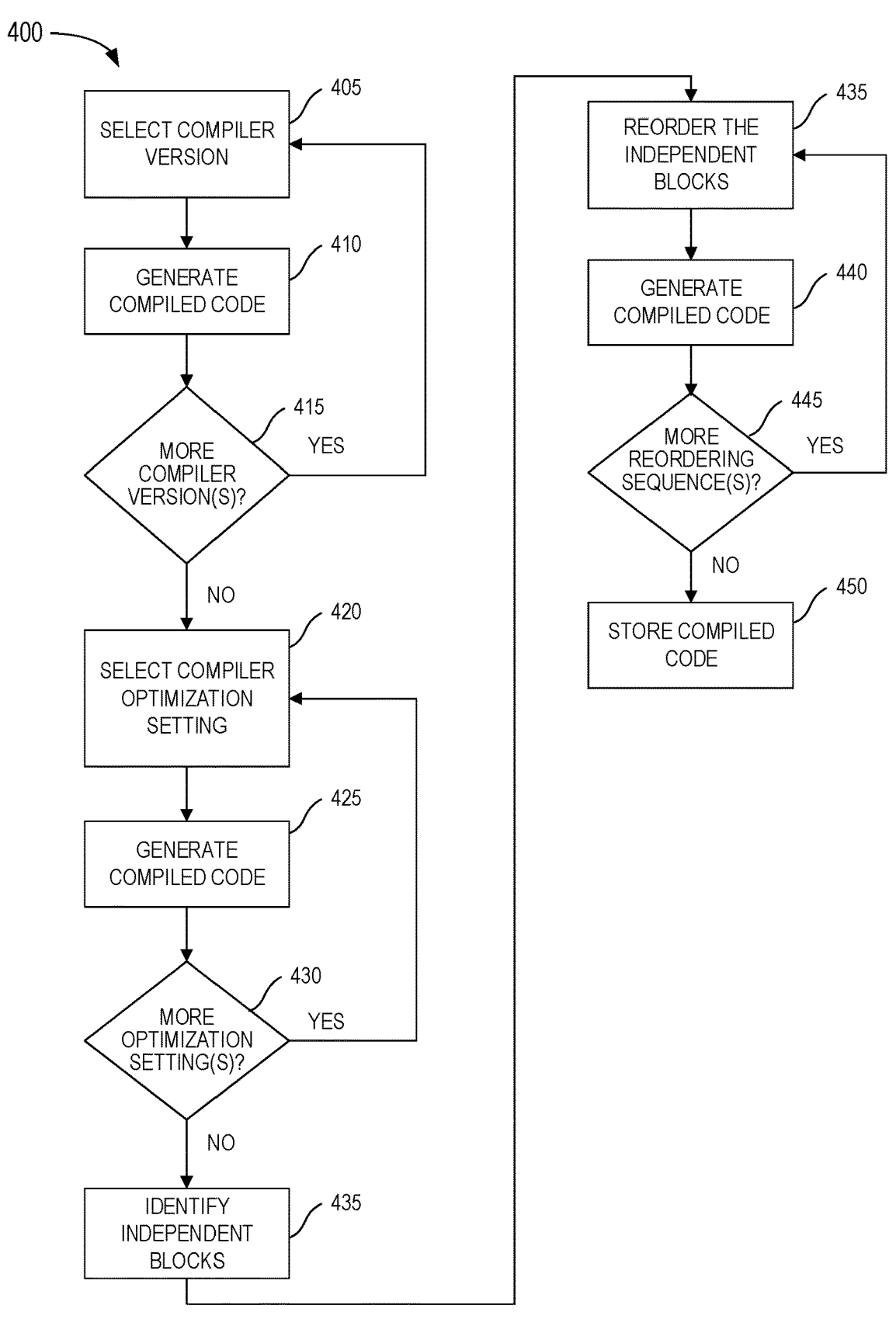
FIG. 4 depicts an example method for generating varied execution paths using different mechanisms, according to some embodiments of the present disclosure.

FIG. 4 depicts an example method 400 for generating varied execution paths using different mechanisms, according to some embodiments of the present disclosure. In some embodiments, the method 400 may be performed by one or more computing devices (e.g., compilation systems), such as the computer 101 as illustrated in FIG. 1, the multipathing generating component 210 as illustrated in FIG. 2, and/or the computing device 700 as illustrated in FIG. 7.

The method 400 begins at block 405, where source code to be compiled (e.g., 205 of FIG. 2) has been identified, and a compilation system (e.g., 210 of FIG. 2) selects a compiler version (e.g., GCC v10) from the available options to use for the compilation process.

At block 410, with the chosen compiler version, the compilation system generates a version of compiled code. In some embodiments, as discussed above, the generation process may involve translating the high-level programming language of the source code into machine-readable code. The compiled code may differ based on the compiler version selected, potentially leading to various execution paths.

At block 415, the compilation system evaluates the availability of other compiler versions. If more versions are available, the method 400 returns to block 405, where the compilation system selects another compiler version (e.g., GCC v11) to compile the source code. This iterative process ensures the generation of multiple execution paths (also referred to in some embodiments as multiple versions of compiled code), each representing a unique combination influenced by the choice of compiler version.

If, at block 415, the compilation system determines no more compiler versions are available, the method 400 moves to block 420, where the compilation system evaluates the available optimization settings within a single compiler (e.g., "O0" for no optimization, "O1" for basic optimization, "O2" for full optimization, and "O3" for maximum optimization), and selects one to compile the source code. In some embodiments, the selection of optimization setting is based on one or more predefined criteria and the target system's configuration and requirements.

At block 425, the selected optimization setting (e.g., "O0" for no optimization) is applied during the compilation process. In some embodiments, by applying the optimization strategy associated with the selected setting, the compilation system may translate the source code into machine-readable code. The generated compiled code, which is optimized according to the selected setting, may introduce variations in timing and/or sequencing of executing certain functions (e.g., those that are subject to concurrent execution) within the source code.

At block 430, the compilation system assesses the availability of other optimization settings. If there are additional settings to explore, the method 400 returns to block 420, where a different optimization setting (e.g., "O3" for maximum optimization) is selected. The newly selected optimization setting may then be applied in the subsequent compilation at block 425, and generate another version of compiled code. In some aspects, the compilation system may evaluate compilation settings with respect to each compiler version. That is, in addition to using multiple compiler versions, the compilation system may use multiple optimization settings with respect to each compiler version to generate a set of compiled code alternatives for each compiler version.

If the compilation system determines that no more optimization settings are available at block 430, the method 400 proceeds to block 435, where the compilation system identifies logically independent code within the source code. In some embodiments, logically independent code may refer to sections or blocks of code that do not depend on each other's execution outcomes or state changes. These segments or blocks may be executed or reordered without affecting the overall logic or outcome of the program. In some aspects, these independent blocks of code may be manually specified (e.g., indicated by the developer) and/or inferred or determined by the compilation system based on evaluating the source code.

At block 435, the compilation system reorders the identified logically independent code segments or blocks. In some embodiments, the rearrangement may introduce variations in the compiled code.

At block 440, the compilation system generates a version of compiled code for the source code based on the new ordering of the identified logically independent code segments.

At block 445, the compilation system assesses the possibilities of further rearrangements. For example, in some embodiments, the compilation system may check if there are other potential combinations or sequences in the order of these identified logically independent code blocks that have not been explored. If all combinations have been exhausted, the method 400 moves to block 450. In some aspects, as discussed above, the compilation system may evaluate alternative code block orders with respect to each alternative set of compilation settings and/or with respect to each compiler version. That is, in addition to using multiple compiler versions (and/or multiple optimization settings with respect to each compiler version), the compilation system may further use different orders of the independent blocks to generate a set of compiled code alternatives for each compiler version and set of optimization settings.

At block 450, the multiple versions of compiled code, produced by different compiler versions, optimization settings, and rearrangements of independent code segments, are saved for further execution. In some embodiments, the multiple versions of compiled code may be saved into a database, which provides structured storage and facilitates efficient retrieval of specific versions of compiled code when required.

The illustrated example method 400 depicts an approach that incorporates different compiler versions, optimization settings, and rearrangements of logically independent code segments to generate varied execution paths. The depicted method 400 is only provided for conceptual clarity. In some embodiments, such as when multiple different compiler versions are available, the generation of different execution paths may be achieved by utilizing different compiler versions. Each compiler, with its unique algorithms and strategies, may produce different compiled code, leading to varied execution paths. In some embodiments, such as where only a single compiler is available, the compilation system may compile the source code using different optimization settings to produce varied compiled code. In some embodiments, the compilation system may focus primarily on the structural aspects of the code (e.g., the ordering of logically independent blocks). By identifying and rearranging logically independent code segments, the compilation system may introduce variations in the compiled code.

That is, depending on the particular implementation, the compilation system may use different approaches (as well as different combinations of approaches) to produce alternative compiled code segments. For example, the compilation system may use both different compiler versions and different compiler settings, different compiler versions and different block ordering, different compiler settings and different block orderings, different compiler versions, compiler settings, and block orderings, and the like. Additionally, though three approaches (e.g., different compiler versions, different optimization settings, and different block ordering) are given as example approaches, other alternative approaches to generating compiled code having different execution paths may be used in embodiments of the present disclosure.

FIG. 5 depicts an example method 500 for implementing different execution paths, according to some embodiments of the present disclosure. In some embodiments, the method 400 may be performed by one or more computing devices (e.g., an execution system), such as the computer 101 as illustrated in FIG. 1, the execution component 230 as illustrated in FIG. 2, and/or the computing device 700 as illustrated in FIG. 7. In some embodiments, the execution system and the compilation system may be components of the same computing system, as discussed above.

The method 500 begins at block 505, where an execution system (e.g., 230 of FIG. 2) runs a version of compiled code. In some embodiments, each version of compiled code 215 may represent a distinct path of execution. These paths may vary from one another in aspects such as timing and/or sequencing of executing certain functions defined within the source code, especially those that are designed for concurrent operation. In some embodiments, these variations arise due to factors such as the compiler used, the optimization setting applied, and potentially the execution order of logically independent code segments.

At block 510, the execution system monitors the execution process for any errors. The execution system validates whether the version of compiled code is executed properly and meets all expected outcomes or criteria. If the execution system detects any discrepancies or failures during execution, the method 500 proceeds to block 520, where an alternative version of compiled code is retrieved. In some embodiments, as discussed above, the alternative version of compiled code may generally perform the same operation or result in the same outcome(s) using a different execution path, and may therefore increase the likelihood of successful execution. If, at block 510, the execution system determines that the execution was successful (indicating the version of compiled code has functioned as expected), the method 500 proceeds to block 515, where the method ends.

In some embodiments, the method 500 may be reiterated any number of times, such as for each block or segment of the overall source code. For example, after completing the operations at block 515, the execution system may proceed to execute the compiled code of another section or block of source code to-be-executed, and repeat the method 500. Such repeated iterations may ensure a thorough execution and examination of the entire source code.

FIG. 6 depicts a flow diagram of an example method 600 for multipathing generation and execution, according to some embodiments of the present disclosure.

At block 605, one or more portions of a software-based task (e.g., source code 205 of FIG. 2) to be executed is identified. In some embodiments, the one or more portions of the software-based task may be designed for concurrent execution.

At block 610, a plurality of segments of compiled code (e.g., compiled code 215 of FIG. 2) for executing the identified one or more portions of the software-based task (e.g., source code 205 of FIG. 2) are generated. In some embodiments, each of the plurality of segments of compiled code may result in different timing when executed. In some embodiments, each of the plurality of segments of compiled code may comprise a different sequence or order of instructions. In some embodiments, the plurality of segments of compiled code may be generated by a plurality of compilers, each respective path being generated by a respective compiler of the plurality of compilers (as depicted by blocks 405-415 of FIG. 4). In some embodiments, the plurality of segments of compiled code may be generated using a single compiler with a plurality of optimization settings, each respective path being generated by a respective optimization setting of the plurality of optimization settings (as depicted by blocks 420-430 of FIG. 4). In some embodiments, the process of generating the plurality of segments of compiled code for executing the identified one or more portions of the software-based task may comprise: identifying logically independent code segments among the one or more portions that are subject to concurrent execution (as depicted at block 435 of FIG. 4), and generating the plurality of segments of compiled code through one or more compilers by altering an order of execution for the identified logically independent code segments (as depicted by blocks 435-445 of FIG. 4).

At block 615, errors during execution of a first segment of compiled code (e.g., compiled code 225 of FIG. 2) from the plurality of segments of compiled code are monitored (as depicted at block 510 of FIG. 5).

At block 620, upon detecting an error in the first segment of compiled code, a second segment of compiled code from the plurality of segments of compiled code is executed (as depicted at block 520 of FIG. 5).

FIG. 7 depicts an example computing device 700 for multipathing generation and execution, according to some embodiments of the present disclosure. Although depicted as a physical device, in some embodiments, the computing device 700 may be implemented using virtual device(s), and/or across a number of devices (e.g., in a cloud environment). The computing device 700 can be embodied as any computing device, such as the computer 101 as illustrated in FIG. 1, the multipathing generation component 210, and/or the execution component 230 as illustrated in FIG. 2.

As illustrated, the computing device 700 includes a CPU 705, memory 710, storage 715, one or more network interfaces 725, and one or more I/O interfaces 720. In the illustrated embodiment, the CPU 705 retrieves and executes programming instructions stored in memory 710, as well as stores and retrieves application data residing in storage 715.

The CPU 705 is generally representative of a single CPU and/or GPU, multiple CPUs and/or GPUs, a single CPU and/or GPU having multiple processing cores, and the like. The memory 710 is generally included to be representative of a random access memory. Storage 715 may be any combination of disk drives, flash-based storage devices, and the like, and may include fixed and/or removable storage devices, such as fixed disk drives, removable memory cards, caches, optical storage, network attached storage (NAS), or storage area networks (SAN).

In some embodiments, I/O devices 735 (such as keyboards, monitors, etc.) are connected via the I/O interface(s) 720. Further, via the network interface 725, the computing device 700 can be communicatively coupled with one or more other devices and components (e.g., via a network, which may include the Internet, local network(s), and the like). As illustrated, the CPU 705, memory 710, storage 715, network interface(s) 725, and I/O interface(s) 720 are communicatively coupled by one or more buses 730.

In the illustrated embodiment, the memory 710 includes a multipathing generation component 750, an execution component 755, and a recording component 760. Although depicted as a discrete component for conceptual clarity, in some embodiments, the operations of the depicted component (and others not illustrated) may be combined or distributed across any number of components. Further, although depicted as software residing in memory 710, in some embodiments, the operations of the depicted components (and others not illustrated) may be implemented using hardware, software, or a combination of hardware and software.

In one embodiment, the multipathing generation component 750 may generate multiple execution paths (also referred to in some embodiments as multiple versions of compiled code) for a source code, using different compilation techniques. For example, in one embodiment, multiple execution paths may be developed by using different compilers. In another embodiment, multiple execution paths may be produced by applying different optimization settings within a single compiler. In another embodiment, multiple execution paths may be generated by rearranging the order of logically independent code segments.

In one embodiment, the execution component 755 may run execution paths and monitor their performance and outcomes. For example, when multiple execution paths (also referred to in some embodiments as multiple versions of compiled code) are available, one may be selected for runtime execution. As the selected path runs, the execution component 755 may monitor whether the version of compiled code is executed properly and watch for any errors or failures. If any errors or failures are detected during the execution process, the execution component 755 may trigger a switch to initiate the execution of an alternative path.

In one embodiment, the recording component 760 may track information related to the performance of each execution path at runtime, as well as any errors arise. The record component 760 may maintain records of which paths were selected for execution under certain conditions or scenarios. Such information may then be used to further refine and optimize both the generation and selection processes. In some embodiments, the recording component 760 may save the path performance data and path selection records into local storage (e.g., storage 715) or a remote database (e.g., 220 of FIG. 2).

In the illustrated example, the storage 715 may include source code 775, different versions of compiled code 780, path selection records 785, and path performance data 790.

In some embodiments, the source code 775 may refer to a set of instructions or scripts developed for specific tasks, operations, and/or functions within a target system (e.g., a computer system or a software application). In some embodiments, the source code 775 may be written in a high-level programming language. In some embodiments, the functions defined by the source code may include functions that are designed for concurrent execution. In some embodiments, each of the different versions of compiled code 780 may refer to a distinct execution path, and may be written in a machine-readable language, such as machine code or assembly code. In some embodiments, the path selection records 785 may include documents detailing the sequence in which pre-generated paths were selected during execution, as well as the conditions and configurations surrounding these selections. In some embodiments, the path performance data 790 may include metrics or parameters reflecting the performance of each path when being executed.

In some embodiments, the source code 775, different versions of compiled code 780, path selection records 785, and path performance data 790 may be saved in a remote database (e.g., test database 220 of FIG. 2) that connects to the computing device 700 via a network (e.g., 235 of FIG. 2).

In the preceding, reference is made to embodiments presented in this disclosure. However, the scope of the present disclosure is not limited to specific described embodiments. Instead, any combination of the features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages discussed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system."

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

While the foregoing is directed to embodiments of the present disclosure, other and further embodiments of the disclosure may be devised without departing from the basic scope thereof, and the scope thereof is determined by the claims that follow.

What is claimed is:

1. A method comprising:

identifying one or more portions of a software-based task to be executed;

generating a plurality of segments of compiled code for executing the identified one or more portions of the software-based task, comprising:

determining one or more compilers and, for each determined compiler, one or more compiler optimization settings, each optimization setting corresponding to a respective optimization level, generating a first set of compiled code by applying the determined one or more compilers and the corresponding one or more compiler optimization settings to the one or more portions of the software-based task, identifying logically independent code segments within the one or more portions of the software-based task, and generating a second set of compiled code by altering an order of execution for the identified logically independent code segments to generate the plurality of segments of compiled code, wherein the plurality of segments of compiled code comprises the first and second sets of compiled code;

monitoring for errors during execution of a first segment of compiled code from the plurality of segments of compiled code; and upon detecting an error in the first segment of compiled code, executing a second segment of compiled code from the plurality of segments of compiled code.

2. The method of claim 1, wherein the one or more portions of the software-based task are designed for concurrent execution.

3. The method of claim 1, wherein each of the plurality of segments of compiled code results in different timing when executed.

4. The method of claim 1, wherein each of the plurality of segments of compiled code comprises a different sequence of instructions.

5. The method of claim 1, wherein the plurality of segments of compiled code are generated by a plurality of compilers, each respective path being generated by a respective compiler of the plurality of compilers.

6. The method of claim 1, wherein the plurality of segments of compiled code are generated using a single compiler with a plurality of optimization settings, each respective path being generated by a respective optimization setting of the plurality of optimization settings.

7. The method of claim 1, wherein the one or more compiler optimization settings comprises at least one of:

a first optimization setting corresponding to no optimization, a second optimization setting corresponding to basic optimization, a third optimization setting corresponding to full optimization, and a fourth optimization setting corresponding to maximum optimization.

8. A system comprising:

one or more memories collectively storing computer-executable instructions; and one or more processors configured to collectively execute the computer-executable instructions and cause the system to perform an operation, the operation comprising:

identifying one or more portions of a software-based task to be executed;

generating a plurality of segments of compiled code for executing the identified one or more portions of the software-based task, comprising:

determining one or more compilers and, for each determined compiler, one or more compiler optimization settings, each optimization setting corresponding to a respective optimization level, generating a first set of compiled code by applying the determined one or more compilers and the corresponding one or more compiler optimization settings to the one or more portions of the software-based task, identifying logically independent code segments within the one or more portions of the software-based task, and generating a second set of compiled code by altering an order of execution for the identified logically independent code segments to generate the plurality of segments of compiled code, wherein the plurality of segments of compiled code comprises the first and second sets of compiled code;

monitoring for errors during execution of a first segment of compiled code from the plurality of segments of compiled code; and upon detecting an error in the first segment of compiled code, executing a second segment of compiled code from the plurality of segments of compiled code.

9. The system of claim 8, wherein the one or more portions of the software-based task are designed for concurrent execution.

10. The system of claim 8, wherein each of the plurality of segments of compiled code results in different timing when executed.

11. The system of claim 8, wherein each of the plurality of segments of compiled code comprises a different sequence or order of instructions.

12. The system of claim 8, wherein the plurality of segments of compiled code are generated by a plurality of compilers, each respective path being generated by a respective compiler of the plurality of compilers.

13. The system of claim 8, wherein the plurality of segments of compiled code are generated using a single compiler with a plurality of optimization settings, each respective path being generated by a respective optimization setting of the plurality of optimization settings.

14. The system of claim 8, wherein the one or more compiler optimization settings comprises at least one of:

a first optimization setting corresponding to no optimization, a second optimization setting corresponding to basic optimization, a third optimization setting corresponding to full optimization, and a fourth optimization setting corresponding to maximum optimization.

15. A computer program product, comprising:

a computer-readable storage medium having computer-readable program code executable to cause the computer program product to perform an operation, the operation comprising:

identifying one or more portions of a software-based task to be executed;

generating a plurality of segments of compiled code for executing the identified one or more portions of the software-based task, comprising:

determining one or more compilers and, for each determined compiler, one or more compiler optimization settings, each optimization setting corresponding to a respective optimization level, generating a first set of compiled code by applying the determined one or more compilers and the corresponding one or more compiler optimization settings to the one or more portions of the software-based task, identifying logically independent code segments within the one or more portions of the software-based task, and generating a second set of compiled code by altering an order of execution for the identified logically independent code segments to generate the plurality of segments of compiled code, wherein the plurality of segments of compiled code comprises the first and second sets of compiled code;

monitoring for errors during execution of a first segment of compiled code from the plurality of segments of compiled code; and upon detecting an error in the first segment of compiled code, executing a second segment of compiled code from the plurality of segments of compiled code; and one or more processors, each processor of which is configured to execute at least a respective portion of the computer-readable program code.

16. The computer program product of claim 15, wherein each of the plurality of segments of compiled code results in different timing when executed.

17. The computer program product of claim 15, wherein each of the plurality of segments of compiled code comprises a different sequence or order of instructions.

18. The computer program product of claim 16, wherein the plurality of segments of compiled code are generated by a plurality of compilers, each respective path being generated by a respective compiler of the plurality of compilers.

19. The computer program product of claim 16, wherein the plurality of segments of compiled code are generated using a single compiler with a plurality of optimization settings, each respective path being generated by a respective optimization setting of the plurality of optimization settings.

20. The computer program product of claim 16, wherein the one or more compiler optimization settings comprises at least one of:

a first optimization setting corresponding to no optimization, a second optimization setting corresponding to basic optimization, a third optimization setting corresponding to full optimization, and a fourth optimization setting corresponding to maximum optimization.

* * * * *